United States Patent Office 2,935,241
Patented May 3, 1960

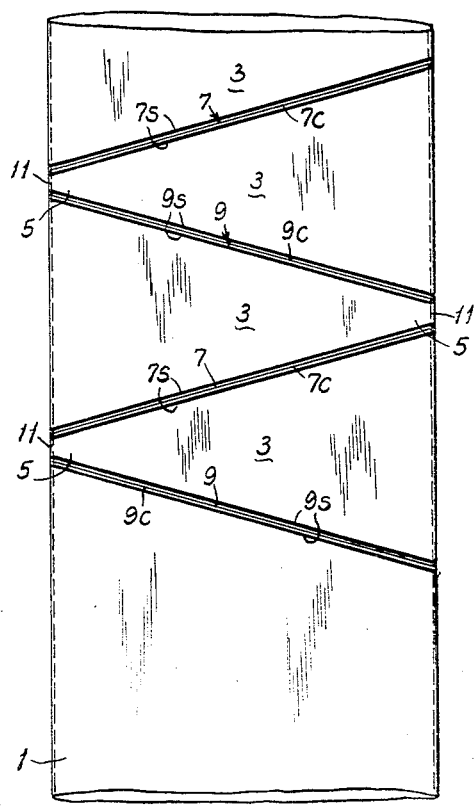
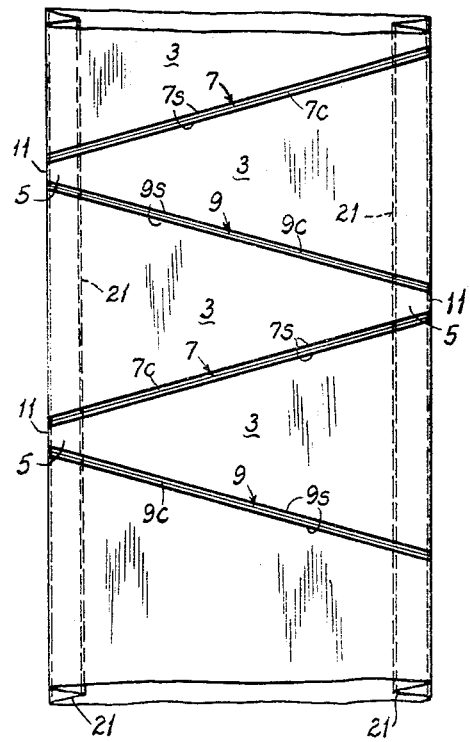
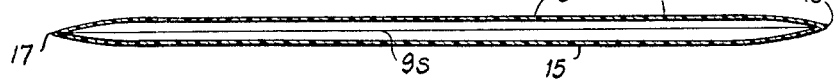
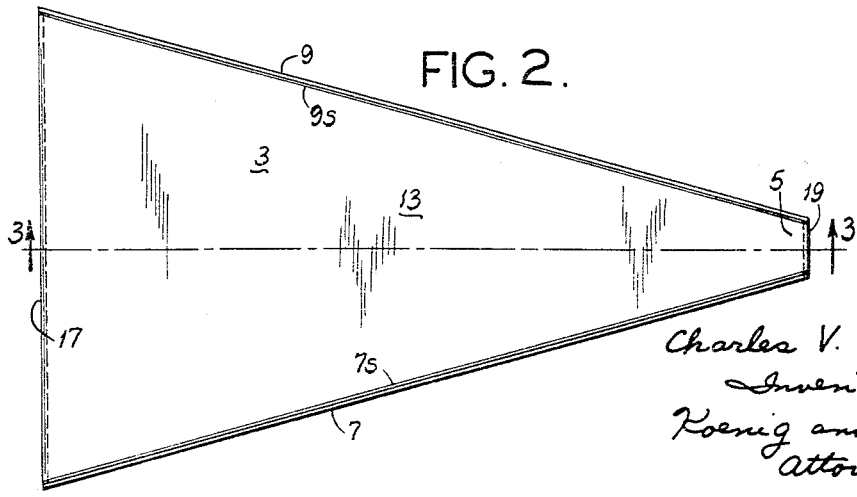

2,935,241

BAG

Charles V. Brady, St. Louis, Mo., assignor to Bemis Bro. Bag Company, St. Louis, Mo., a corporation of Missouri Application June 21, 1957, Serial No. 667,164

4 Claims. (Cl. 229—53)

This invention relates to bags, and more particularly to bags for holding liquid or semiliquid materials.

Among the several objects of the invention may be noted the provision of a bag for holding liquid or semiliquid which is of such form as to facilitate the filling of the bag and the emptying of the filled bag (one example being a plastic bag for holding milk); and the provision of a bag of this class which is of such construction as to be economical to manufacture. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, Fig. 1 is a view in plan illustrating a mode of manufacturing bags of this invention;

Fig. 2 is an enlarged view of one of the bags formed according to Fig. 1;

Fig. 3 is a cross section taken on line 3—3 of Fig. 2, thicknesses being exaggerated; and, Fig. 4 is a view similar to Fig. 1 illustrating modifications.

Corresponding reference characters indicate corresponding parts throughout the several views of the drawings.

Referring to the drawings, there is indicated at 1 in Fig. 1 a continuous (ungusseted) tube 1 of flexible heat-sealable sheet plastic material such as polyethylene. This tube is shown as a flat seamless tube made, for example, in a well-known manner by extruding polyethylene around a bubble of air. The tube could be a tube consisting of a single web of sheet plastic material formed into a tube having a longitudinal heat-sealed seam, or it may be a tube consisting of two superposed webs of sheet plastic material having longitudinal heat-sealed seams at the side margins. Also, while the tube 1 is described above as a heat-sealable sheet plastic tube such as polyethylene, it will be understood that the tube may consist essentially of a nonheat-sealing material such as cellophane having a heat-sealing coating thereon, or multi-ply material the inner ply of which is a heat-sealable material. The term "heat-sealable" is intended to apply to such materials. The tube may even be made from a web of paper, for example, which may be specially treated to be liquid-proof, in which case the seals may be made by means of suitable adhesive applied as the web is being formed into the tube.

In accordance with this invention, the tube 1 (being of heat-sealable character) is heat-sealed and segmented into individual sealed bags 3 each having a spout 5 by heat-sealing and segmenting it successively on lines such as are indicated at 7 and 9 which extend diagonally completely across the tube. Successive lines 7 and 9 are oppositely angled. The heat sealing and segmenting on lines 7 and 9 are preferably carried out, as to lines 7, by making two spaced liquid-tight pressure seals 7s and segmenting on line 7c between seals 7s and, as to lines 9, by making two spaced liquid-tight seals 9s and segmenting on line 9c between seals 9s. Lines 7 recur at equal intervals along the length of the tube, and lines 9 recur at the same intervals along the length of the tube. All the lines 7 are at the same angle to the length of the tube, and all the lines 9 are at the same angle to the length of the tube, this being the same as the angle of lines 7 but in the opposite sense with respect to the angle of lines 7. The successive lines 7, 9 and 7 are spaced apart at the side of the tube toward which they converge as indicated at 11.

The heat sealing and segmenting on each two successive lines 7, 9 or 9, 7 as the case may be results in the severance of a bag 3 from the tube 1 which is of triangular form. Each bag 3 (see Figs. 2 and 3) has triangular front and back walls 13 and 15 constituted by portions of the walls of the tube 1. These walls are joined at the bottom of the bag by an integral bottom fold 17, which originally was a portion of one side edge of the tube. Each bag tapers down to the narrow top end portion at which the front and back walls are joined by the integral fold 19, which originally was a portion of the other side edge of the tube. The triangular front and back walls 13 and 15 are secured together at both sides by the heat-sealed seams 7s and 9s. These seams extend continuously from the bottom 17 of the bag to the narrow end 19 of the bag.

To fill a bag, the naarrow end of the bag is cut off or pierced, and a filling tube may then be inserted. When the bag has been filled, the filling tube is withdrawn and the narrow end of the bag is resealed by heat-sealing or by pinching closed with a suitable type of clamp or other suitable means. Then to empty the bag, it is simply necessary to cut off or pierce the narrow end of the bag in the first case, or remove the clamp in the second case.

Fig. 4 shows a modification in which the tube is a gusseted tube instead of a flat tube, the gussets being indicated at 21. As a result the bags have a gusseted or intucked bottom instead of a single-fold bottom such as indicated at 17 in Fig. 3, and a gusset or intuck at the narrow end of the bag instead of the single fold such as indicated at 19 in Fig. 3. Otherwise the bags made according to Fig. 4 are the same as those made according to Fig. 1.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be inerpreted as illustrative and not in a limiting sense.

I claim:

1. A bag having front and back walls joined at both the bottom and top of the bag by integral folds, said walls being of generally triangular form having side edges which converge toward the top of the bag, and said front and back walls being secured together at both sides by seams extending continuously from the bottom to the narrow top of the bag.

2. A bag as set forth in claim 1 made of heat-sealable material with said seams being heat-sealed seams.

3. A bag as set forth in claim 2 wherein the top and bottom folds are single folds.

4. A bag as set forth in claim 2 having gussets at top and bottom.

(References on following page)

References Cited in the file of this patent

UNITED STATES PATENTS

| | | |
|---|---|---|
| 259,238 | Stocking | June 6, 1882 |
| 1,145,093 | Swift | July 6, 1915 |
| 1,157,568 | Mills | Oct. 19, 1915 |
| 1,960,232 | Corbe | May 29, 1934 |
| 2,013,672 | Royal | Sept. 10, 1935 |
| 2,085,766 | Potdevin et al. | July 6, 1937 |
| 2,087,236 | Anders | July 20, 1937 |
| 2,138,119 | Potdevin et al. | Nov. 29, 1938 |
| 2,283,069 | Knuetter | Dec. 2, 1941 |
| 2,718,105 | Ferguson et al. | Sept. 20, 1955 |

FOREIGN PATENTS

| | | |
|---|---|---|
| 1,130,743 | France | Oct. 8, 1956 |